United States Patent Office 3,417,753
Patented Dec. 24, 1968

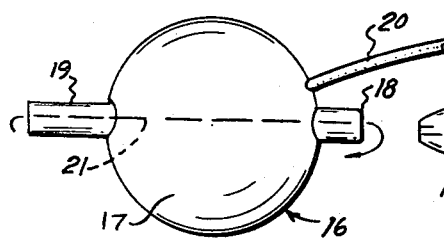
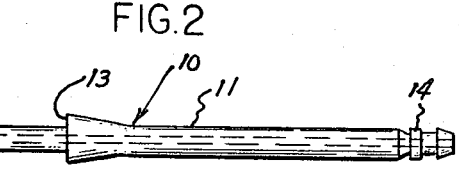
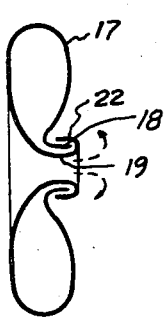
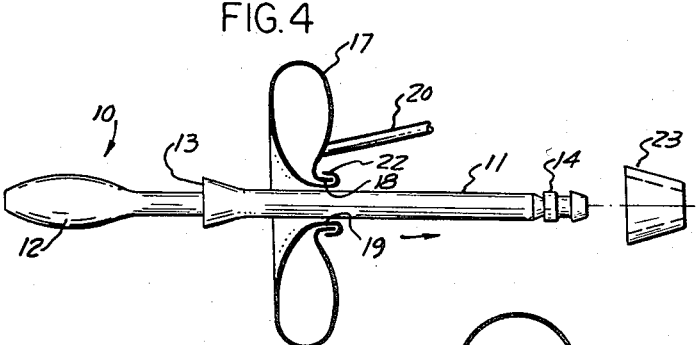
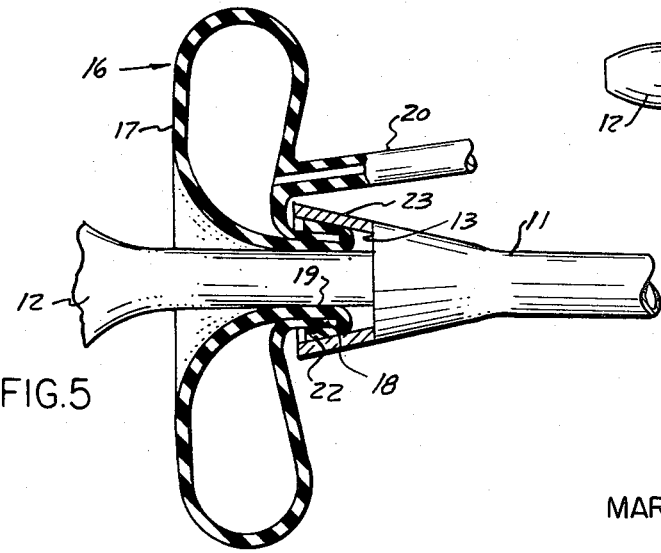
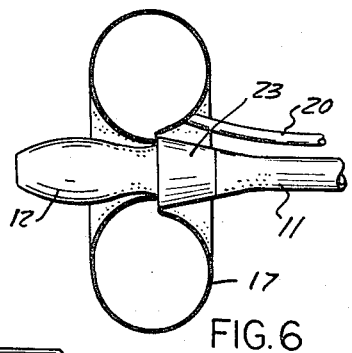
INVENTOR
MARTIN MATTLER

3,417,753
DISPOSABLE CATHETER AND METHOD FOR FORMING SAME
Martin Mattler, Huntington Woods, Mich.
(11000 W. McNichols, Detroit, Mich. 48221)
Continuation-in-part of application Ser. No. 499,784, Oct. 21, 1965. This application Dec. 5, 1967, Ser. No. 688,170
4 Claims. (Cl. 128—349)

ABSTRACT OF THE DISCLOSURE

A disposable catheter formed of a rigid, elongated catheter tube having an inflatable ring mounted upon the tube, the ring being formed of a latex-like, flexible material, thin-walled balloon having opposed originally outwardly nipples opening into the balloon. One of said nipples is approximately twice the length of the second nipple and is turned inside out, to extend through the balloon and through the shorter nipple, with the free half of the longer nipple then being bent outwardly around and surrounding the outside of the shorter nipple, wherein both the exterior and interior surfaces of the shorter nipple are lined, in surface to surface contact, by the longer nipple to form an air seal therebetween, and with the interior surface of the longer nipple being the only part of the ring normally in contact with the tube. An air entry into the ring provides a passageway for inflating the ring upon the tube.

Parent application

This application is a continuation-in-part of my earlier filed application, Ser. No. 499,784, filed Oct. 21, 1965, for a disposable catheter, now abandoned.

Background of invention

In the past, inflatable types of catheters have been too costly to permit their being made as a single use throw-away catheter. Therefore, it has been necessary to sterilize them after each use so that they may be reused. Such sterilization introduces additional handling expense and loss of time. For these reasons, as well as because of the possibility of incomplete sterilization, it is desirable to have available a catheter for uses in hospitals, medical clinics and the like, which are so inexpensively made as to be disposable.

Since the catheter tube is normally made of a relatively slippery surface material, sealing an inflatable ring to the tube to prevent air leakage, is both a difficult and expensive problem to solve. This invention is concerned with the solution of the problem of air sealing and produces an inflatable catheter tube which is sufficiently inexpensive as to be disposable.

Summary of invention

Hence, it is an object of this invention to provide a catheter tube-inflatable ring assembly, the ring being formed of an inflatable balloon having oppositely extending nipples, with one longer nipple being turned inside out and extending through the inside of and being bent around the outside of the second shorter nipple to form an air seal as well as a central hub surrounding and in contact with the catheter tube. Such construction results in such an inexpensive construction that it is capable of being singly used and is intended for disposal after each use.

A further object of this invention is to provide a method comprising mounting an inflatable, balloon-like member, upon a rigid, catheter tube, wherein the balloon-like member is provided with oppositely opening nipples, by turning one longer nipple inside out to extend it through and reversely bend its outer half over the shorter nipple in a telescoping or overlapping relationship so as to form an air seal between the two nipples, wherein the balloon-like member is thereby formed into a ring formation, with the hub of the ring being formed by the three nipple layers.

These and other objects and advantages of this invention will become apparent upon reading the following description of which the attached drawings form a part.

Description of drawings

FIG. 1 is an elevational view of the balloon-like member, before assembly;

FIG. 2 is an elevational view of the catheter tube member;

FIG. 3 illustrates, in cross-section, the step of turning the longer nipple inside out and extending it through and bending its free end over the shorter nipple;

FIG. 4 shows the step of sliding the tube through the hub forming nipples to mount the ring upon the tube;

FIG. 5 is an enlarged, cross-sectional view showing the ring completely mounted upon the tube, but before inflation; and FIG. 6 illustrates in cross-section, a partial inflation of the balloon-like member into its ring shape.

Detailed description

The disposable catheter herein, comprises a catheter tube 10 which is formed of a rigid, relatively slippery and smooth surfaced, light-weight inexpensive material, such as a molded polystyrene or other suitable plastic. The tube has an elongated stem portion 11, terminating in a bulbous forward end 12, with an intermediate annular shoulder portion 13, and a rear end 14 shaped to receive the conventional rubber tube used with such catheters. The tube 10 is also provided with a central internal passageway 15.

A ring-forming member 16 is made of a balloon 17 formed of a thin-walled, flexible, resilient, air impervious material, such as latex or latex-like plastic, which has a relatively rough surface to provide considerable friction. Such balloon is intended to form an inflated ring surrounding the outside of the tube 10 for closing off a body cavity within which the catheter tube is inserted.

The balloon is provided with two oppositely extending nipples 18 and 19, which open into the interior thereof, and in addition is provided with an air entry or conveying tube 20 through which air may be blown into the balloon. Nipple 19 is approximately twice the length of nipple 18.

The method of assemblying the ring-forming member 16 upon the tube 10 is as follows:

As shown by the dotted arrow 21 in FIG. 1, the longer nipple 19 is turned inside out and pushed through the shorter nipple 18. Then its outer half is bent around the outside of the shorter nipple (see dotted arrows in FIG. 3) to form an exterior cuff or fold 22 overlapping the outer surface of the shorter nipple 18. Hence, the shorter nipple 18 is sandwiched between and is lined by the folded or bent longer nipple 18 to form a full surface to surface contact therebetween. The three layer nipple formation now forms a mounting hub for the now ring-shaped member.

Next, as shown in FIG. 4, the stem 11 of the tube 10 is pushed through the hub until the hub-nipples are located just forwardly of the shoulder 13. At this point, a tapered, thin-walled, resilient ring 23 is pushed over the stem 11 to overlap the nipples and engage the shoulder 13 to thereby mechanically clamp the hub-nipples to the stem 11.

The relatively high frictional contact between the layers of the nipples caused by the radially outwardly stretching of the nipples by the slightly larger diameter stem 11, as well as by the rough surfaces of the nipple forming material and also by the clamping ring 23, causes a tight air seal to be formed by and between the nipples. The seal between the hub-nipples and the slippery stem 11, although of a relatively poor quality, is adequate to retain body fluids, as contrasted with sealing against air.

The clamping ring 23 may be made of the same plastic material as the tube 10, or of any other suitable material, which is resilient enough to be pushed over and then engage the shoulder 13.

Where desired, to facilitate easier handling of the ring in mounting it upon the tube, a suitable adhesive cement may be positioned between the outer surface of the shorter nipple 18 and the cuff portion 22 of the longer nipple 19, thereby to prevent the tube from separating during the time the tube is pushed through the nipples.

After the assembly is completed, it may be inserted into a body cavity and thereafter, the ring may be inflated (see FIG. 6) by pumping air into it using a conventional hand-held, air pumping bulb. The amount of inflation is thus controlled by the user.

This invention may be further developed within the scope of the following claims. Accordingly, it is desired that the foregoing description be read as being merely illustrative of operative embodiment of this invention, and not in a strictly limited sense.

Having fully described an operative embodiment of this invention, I now claim:

1. A method for forming a catheter formed of an assembly of an elongated, rigid catheter tube of small diameter and of a relatively slippery surface material, and an inflatable ring, surrounding and mounted upon the tube and formed of a thin-walled, air tight balloon, made of a flexible, latex-like material, having an open elongated nipple at each of its opposite ends, with one nipple being longer than the other, and an air entry tube opening into said balloon, comprising:

first, turning the longer nipple inside out and extending it through the shorter nipple, and then bending its outer end around the outer surface of the shorter nipple to thereby line both the inside and outside surfaces of the shorter nipple with portions of the longer nipple, to form a three layer hub, with the balloon thus being formed into a ring shape;

second, inserting the tube through said hub to radially stretch the nipples and to thereby form a tight air seal between the contacting nipple layers while mounting the ring upon the tube for inflation.

2. A method as defined in claim 1, and including the step of clamping the hub upon the tube with a ring clamp.

3. A catheter assembly comprising an elongated tube formed of a material having a smooth, relatively slippery surface;

a ring-forming balloon formed of a thin-walled, latex-like, air impervious material having two oppositely extending elongated nipples opening into the body of the balloon, with one nipple being longer than the other, and an air entry formed in the balloon;

the longer of said nipples being turned inside out, and extending through the interior of and being bent over the exterior surface of the shorter nipple, so that the shorter nipple is sandwiched between and both its exterior and interior surfaces are overlapped, in close face to face contact, by the longer nipple to form a three layer hub portion;

said hub portion being mounted upon and surrounding the tube in contact therewith, and being radially outwardly stretched by the tube;

wherein the balloon forms an air inflatable ring surrounding the hub and the tube, and the two nipples form a surface to surface air seal therebetween.

4. A construction as defined in claim 3, and including a clamping ring, surrounding the hub and mechanically clamping it, radially inwardly, upon the tube.

References Cited

UNITED STATES PATENTS

| | | | |
|---|---|---|---|
| 1,598,283 | 8/1926 | Kinney | 128—350 |
| 1,598,284 | 8/1926 | Kinney | 128—350 |
| 2,792,837 | 5/1957 | Kardos | 128—351 |
| 2,936,760 | 5/1960 | Gants | 128—349 |
| 3,253,594 | 5/1966 | Matthews et al. | 128—348 |

FOREIGN PATENTS

| | | |
|---|---|---|
| 329,354 | 5/1903 | France. |
| 1,091,895 | 11/1954 | France. |

DALTON L. TRULUCK, *Primary Examiner.*

U.S. Cl. X.R.

128—246